（12）United States Patent
Qiu et al.

(10) Patent No.: US 12,322,265 B2
(45) Date of Patent: Jun. 3, 2025

(54) REAL-TIME LANDSLIDE DISASTER MONITORING AND EARLY WARNING SYSTEM BASED ON BEIDOU POSITIONING

(71) Applicant: NORTHWEST UNIVERSITY, Xi'an (CN)

(72) Inventors: Haijun Qiu, Xi'an (CN); Yaru Zhu, Xi'an (CN); Wen Nie, Xi'an (CN)

(73) Assignee: NORTHWEST UNIVERSITY, Xi'An (CN)

( * ) Notice: Subject to any disclaimer, the term of this patent is extended or adjusted under 35 U.S.C. 154(b) by 452 days.

(21) Appl. No.: 17/992,663

(22) Filed: Nov. 22, 2022

(65) Prior Publication Data

US 2023/0410626 A1 Dec. 21, 2023

(30) Foreign Application Priority Data

Jun. 20, 2022 (CN) .......................... 202210695670.4

(51) Int. Cl.
*G08B 21/10* (2006.01)
*G01S 19/42* (2010.01)

(52) U.S. Cl.
CPC .............. *G08B 21/10* (2013.01); *G01S 19/42* (2013.01)

(58) Field of Classification Search
CPC .......... G01S 19/42; G08B 21/10; G01C 11/02
See application file for complete search history.

(56) References Cited

U.S. PATENT DOCUMENTS

2023/0228567 A1* 7/2023 Qiu ........................ G01C 11/02
348/144

FOREIGN PATENT DOCUMENTS

CN     114384510 A  *  4/2022  ........... F16M 11/046
CN     216326474 U  *  4/2022

* cited by examiner

*Primary Examiner* — Lam S Nguyen

(57) ABSTRACT

A real-time landslide disaster monitoring and early warning system based on Beidou positioning comprises a data acquisition module, a signal transmission module and a remote early warning center, wherein the output end of the data acquisition module is connected with the input end of the signal transmission module, and the output end of the signal transmission module is connected with the input end of the remote early warning center; the data acquisition module comprises a fixed seat and a control box, the bottom of the control box is connected with a camera, one side of the control box is fixedly connected with a warning device and a displacement monitoring module, and the side, away from the warning device, of the control box is fixedly connected with a data connector; and the signal transmission module comprises a controller, a memory, a power supply, a Beidou positioning module and a signal projector.

10 Claims, 4 Drawing Sheets

REAL-TIME LANDSLIDE DISASTER MONITORING AND EARLY WARNING SYSTEM BASED ON BEIDOU POSITIONING

CROSS REFERENCE TO RELATED APPLICATION

This patent application claims the benefit and priority under 35 U.S.C. § 119 of Chinese Patent Application No. 202210695670.4, filed on Jun. 20, 2022, the disclosure of which is hereby expressly incorporated by reference herein in its entirety as part of the present application.

TECHNICAL FIELD

The present disclosure relates to the technical field of landslide disaster monitoring, in particular to a real-time landslide disaster monitoring and early warning system based on Beidou positioning.

BACKGROUND ART

Landslide disasters in natural disasters have a great influence and harmfulness on humans. Especially, in recent years, with climate warming and extreme events, landslide disasters are intensified. How to deal with risks of landslide disasters and realize harmonious development is a significant issue about human development.

Beidou navigation system (hereinafter referred to as BDS) is a satellite navigation system with independent construction and operation aiming at the development requirements of national security and economic society, and is an important space infrastructure of China for providing all-weather, full-time and high-precision positioning, navigation and time services for global users. The BDS consists of three parts such as a space segment, a ground segment and a user segment, which can provide all-weather, full-time, high-precision and high-reliability positioning, navigation and time services for all kinds of world-wide users, and has a short-message communication capacity.

However, the monitoring and early warning mechanism based on Beidou positioning cannot be freely adjusted according to actual requirements in the prior art, so the monitoring efficiency of the early warning system is influenced.

SUMMARY

The present disclosure aims to provide a real-time landslide disaster monitoring and early warning system based on Beidou positioning in order to solve the problem that a monitoring and early warning mechanism cannot be freely adjusted according to actual requirements in the prior art.

In order to achieve the above purpose, the present disclosure adopts the following technical scheme.

A real-time landslide disaster monitoring and early warning system based on Beidou positioning comprises a data acquisition module, a signal transmission module and a remote early warning center, wherein the output end of the data acquisition module is connected with the input end of the signal transmission module, and the output end of the signal transmission module is connected with the input end of the remote early warning center;

the data acquisition module comprises a fixed seat and a control box, the bottom of the control box is connected with a camera, one side of the control box is fixedly connected with a warning device and a displacement monitoring module, and the side, away from the warning device, of the control box is fixedly connected with a data connector;

the signal transmission module comprises a controller, a memory, a power supply, a Beidou positioning module and a signal projector, the controller, the memory, the power supply, the Beidou positioning module and the signal projector are all arranged in the control box, the output ends of the Beidou positioning module, the power supply and the camera are all connected with the input end of the controller, and the output end of the controller is respectively connected with the input ends of the signal projector, the memory, the data connector and the warning device;

the bottom of the fixed seat is fixedly connected with a telescopic cylinder, the output end of the telescopic cylinder is fixedly connected with a mounting plate, a mounting groove is formed in the bottom of the mounting plate, a screw is rotatably connected into the mounting groove, the screw is sleeved with a plurality of sliding blocks through treads, a sliding rod is fixedly connected into the mounting groove, a through hole corresponding to the sliding rod is formed in the sliding blocks, and one end of the screw penetrates through the inner wall of the mounting groove and is fixedly connected with a rotary knob; and the bottoms of the sliding blocks are connected through a fixed plate, the bottom of the fixed plate is rotatably connected with the control box through a rotating rod, the bottom of the control box is fixedly connected with a plurality of symmetrically arranged guide rods, the bottom of the guide rod is fixedly connected with a guide block, an annular sliding rail corresponding to the guide block is arranged at the bottom of the fixed plate, the bottom of the control box is fixedly connected with a fixture block, a clamping rod is slidably inserted to the fixture block, and a plurality of clamping grooves corresponding to the clamping rod are formed in the outer wall of the fixed plate in an encircling mode.

Preferably, the displacement monitoring module is a laser displacement sensor.

Preferably, a power connector is fixedly embedded into the exterior of the control box, and the output end of the power connector is connected with the input end of the power supply.

Preferably, a mounting port is formed in the bottom of the control box, a baffle plate is rotatably connected into the mounting port through a rotating shaft, and the end, away from the rotating shaft, of the baffle plate is fixedly connected with the inner wall of the mounting port through a locking screw.

Preferably, the top of the fixed seat is fixedly connected with a plurality of locking blocks, and a locking port is formed in the locking block.

Preferably, one end of the rotary knob is rotatably connected with an arc-shaped inserted rod through a rotating shaft, and a plurality of inserted grooves corresponding to the arc-shaped inserted rod are formed in the mounting plate in an encircling mode.

Preferably, the end, close to the fixed plate, of the clamping rod is fixedly sleeved with a clamping sleeve.

Preferably, a plurality of steel balls are slidably connected into the annular sliding rail, and the edge of the steel ball is in contact with the guide block.

Preferably, the mounting plate is connected with the bottom of the fixed seat through a plurality of symmetrically arranged dampers.

The system has the following beneficial effects.

Firstly, in the system, through the arrangement of a plurality of adjusting mechanisms, the monitoring and early warning mechanism can be freely adjusted, so that the monitoring efficiency of the early warning system is promoted.

Secondly, in the present disclosure, the mounting plate is driven to move up and down by starting the telescopic cylinder, the height of the control box is adjusted, and then the rotary knob is rotated to drive the screw to rotate. Meanwhile, the sliding blocks drive the fixed plate to move, and the horizontal position of the control box is adjusted. Moreover, the direction of the control box can be adjusted by rotating the control box, and then the control box is fixed by using the clamping rod.

Thirdly, in the present disclosure, through the arrangement of the locking blocks, the fixed seat can be fixed conveniently. Meanwhile, the dampers can play a damping and buffering role in the mounting plate. Moreover, the sliding blocks can be prevented from shaking through the sliding rod. Through the arrangement of the arc-shaped inserted rod, the rotary knob can be fixed conveniently. Furthermore, through the arrangement of the guide rods and the guide blocks, the control box can be prevented from shaking.

Reference signs: 1, fixed seat; 2, control box; 3, telescopic cylinder; 4, mounting plate; 5, screw; 6, sliding block; 7, sliding rod; 8, rotary knob; 9, fixed plate; rotating rod; 11, guide rod; 12, guide block; 13, fixture block; 14, clamping rod; 15, locking block; 16, rotating shaft; 17, arc-shaped inserted rod; 18, clamping sleeve; 19, steel ball; 20, damper; 21, camera; 22, warning device; 23, displacement monitoring module; 24, data connector; 25, controller; 26, memory; 27, power supply; 28, Beidou positioning module; 29, signal projector; 30, power connector; 31, rotating shaft; 32, baffle plate; and 33, locking screw.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure.

Embodiment I

Figure 1:
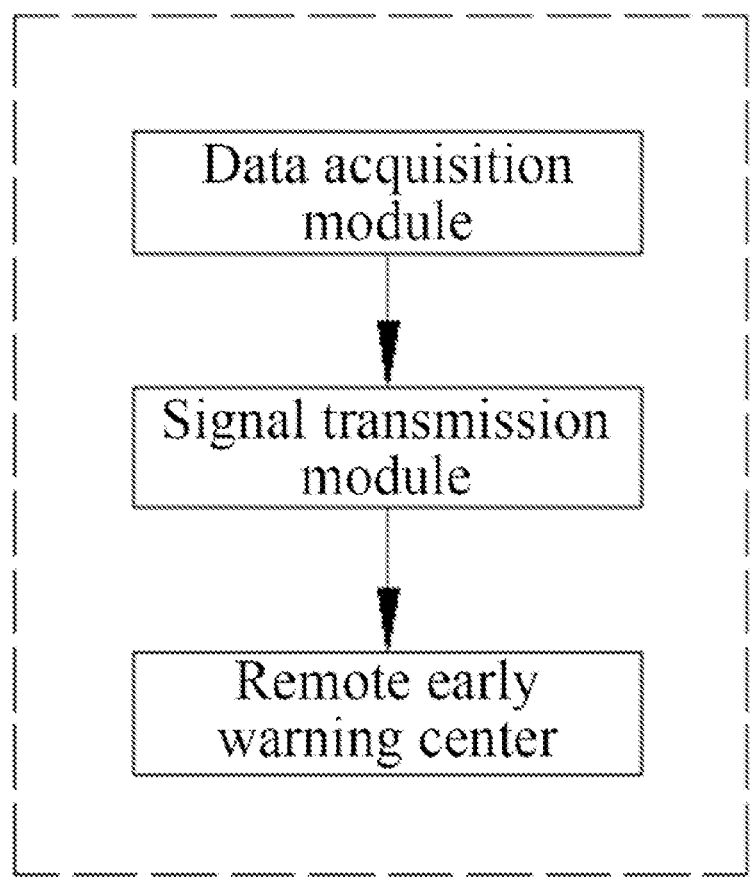
FIG. 1 is a composition diagram of a real-time landslide disaster monitoring and early warning system based on Beidou positioning proposed in the present disclosure.
Figure 2:
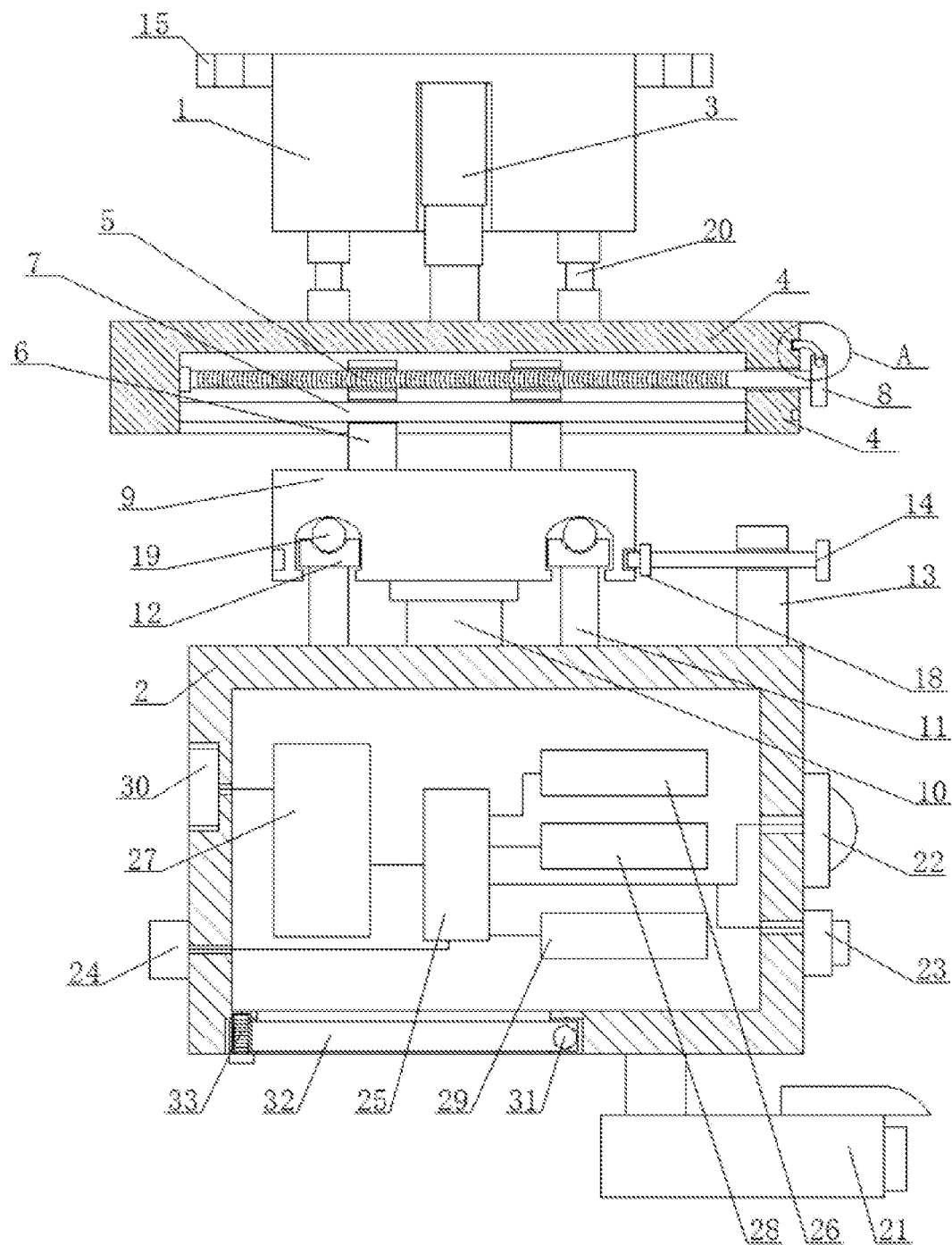
FIG. 2 is a structural schematic diagram of a real-time landslide disaster monitoring and early warning system based on Beidou positioning proposed in the present disclosure.
Figure 3:
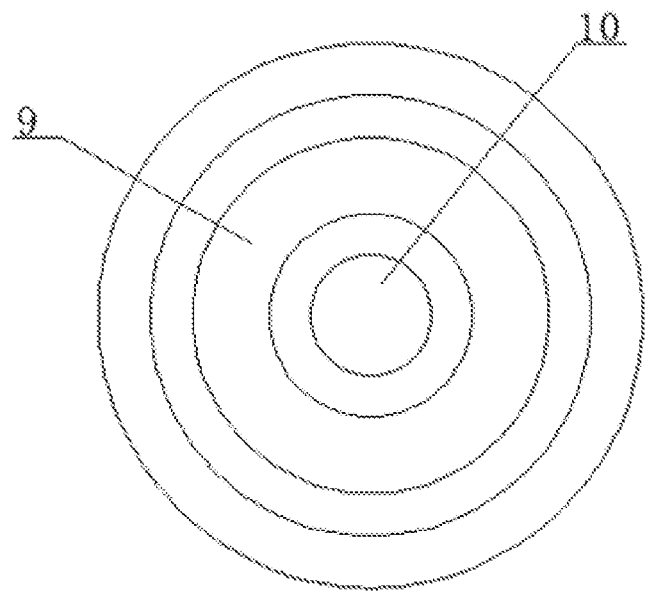
FIG. 3 is an upward structural schematic diagram of a fixed plate of a real-time landslide disaster monitoring and early warning system based on Beidou positioning proposed in the present disclosure.
Figure 4:
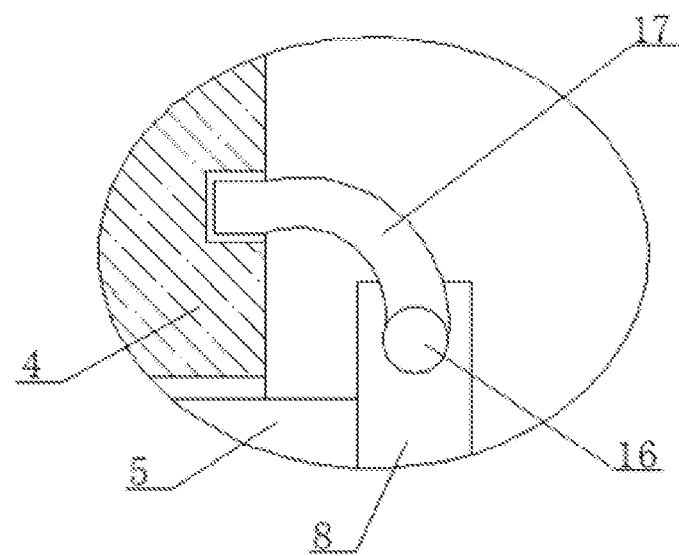
FIG. 4 is a structural schematic diagram of part A in FIG. 2.
Figure 5:
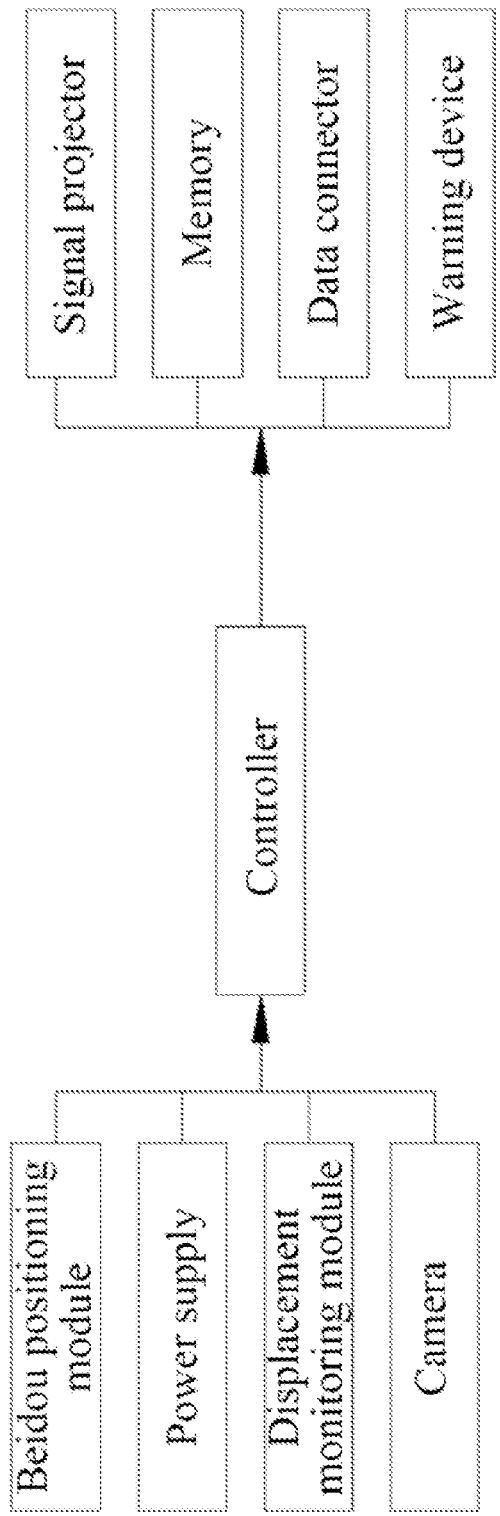
FIG. 5 is a control system schematic diagram of a real-time landslide disaster monitoring and early warning system based on Beidou positioning proposed in the present disclosure.

Referring to FIG. 1 to FIG. 5, a real-time landslide disaster monitoring and early warning system based on Beidou positioning comprises a data acquisition module, a signal transmission module and a remote early warning center, wherein the output end of the data acquisition module is connected with the input end of the signal transmission module, and the output end of the signal transmission module is connected with the input end of the remote early warning center.

The data acquisition module comprises a fixed seat 1 and a control box 2. The top of the fixed seat 1 is fixedly connected with a plurality of locking blocks 15. A locking port is formed in the locking block 15, so that the fixed seat 1 is conveniently fixed. A mounting port is formed in the bottom of the control box 2. A baffle plate 32 is rotatably connected into the mounting port through a rotating shaft 31, so that a control element is protected. The end, away from the rotating shaft 31, of the baffle plate 32 is fixedly connected with the inner wall of the mounting port through a locking screw 33. The bottom of the control box 2 is connected with a camera 21 for monitoring landslide disasters. One side of the control box 2 is fixedly connected with a warning device 22 and a displacement monitoring module 23 for monitoring the displacement conditions of slopes, and simultaneously, an alarm can be given. The displacement monitoring module 23 is a laser displacement sensor. The side, away from the warning device 22, of the control box 2 is fixedly connected with a data connector 24 for conveniently exporting monitoring data.

In the embodiment, the signal transmission module comprises a controller 25, a memory 26, a power supply 27, a Beidou positioning module 28 and a signal projector 29. The controller 25, the memory 26, the power supply 27, the Beidou positioning module 28 and the signal projector 29 are all arranged in the control box 2. The output ends of the Beidou positioning module 28, the power supply 27 and the camera 21 are all connected with the input end of the controller 25 for sending the monitoring data to the controller 25. The output end of the controller 25 is respectively connected with the input ends of the signal projector 29, the memory 26, the data connector 24 and the warning device 22. A power connector 30 is fixedly embedded into the exterior of the control box 2. The output end of the power connector 30 is connected with the input end of the power supply, so that the power supply 27 is conveniently charged.

In the embodiment, the bottom of the fixed seat 1 is fixedly connected with a telescopic cylinder 3 for adjusting the height of a mounting plate 4. The output end of the telescopic cylinder 3 is fixedly connected with the mounting plate 4 for supporting the control box 2. The mounting plate 4 is connected with the bottom of the fixed seat 1 through a plurality of symmetrically arranged dampers 20, and plays a damping and buffering role in the mounting plate 4.

In the embodiment, a mounting groove is formed in the bottom of the mounting plate 4. A screw 5 is rotatably connected into the mounting groove for driving sliding blocks 6 to slide. The screw 5 is sleeved with a plurality of sliding blocks 6 through treads. A sliding rod 7 is fixedly connected into the mounting groove for supporting the sliding blocks 6. A through hole corresponding to the sliding rod 7 is formed in the sliding blocks 6. One end of the screw 5 penetrates through the inner wall of the mounting groove and is fixedly connected with a rotary knob 8 for driving the screw 5 to rotate. One end of the rotary knob 8 is rotatably connected with an arc-shaped inserted rod 17 through a rotating shaft 16 for fixing the rotary knob 8. A plurality of inserted grooves corresponding to the arc-shaped inserted rod 17 are formed in the mounting plate 4 in an encircling mode.

In the embodiment, the end, close to a fixed plate 9, of the clamping rod 14 is fixedly sleeved with a clamping sleeve 18, so that the clamping rod 14 is prevented from falling off from the fixture block 13. The bottoms of the sliding blocks 6 are connected through the fixed plate 9. The bottom of the fixed plate 9 is rotatably connected with the control box 2 through a rotating rod 10 for adjusting the direction of the control box 2. The bottom of the control box 2 is fixedly connected with a plurality of symmetrically arranged guide rods 11. The bottom of the guide rod 11 is fixedly connected with a guide block 12 for preventing the control box 2 from shaking.

In the embodiment, an annular sliding rail corresponding to the guide block 12 is arranged at the bottom of the fixed plate 9. A plurality of steel balls 19 are slidably connected into the annular sliding rail, and the edge of the steel ball 19 is in contact with the guide block 12, so that the frictional force between the guide block 12 and the inner wall of the annular sliding rail is reduced. The bottom of the control box 2 is fixedly connected with a fixture block 13. A clamping rod 14 is slidably inserted into the fixture block 13. A plurality of clamping grooves corresponding to the clamping rod 14 are formed in the outer wall of the fixed plate 9 in an encircling mode, and are used for fixing the control box 2.

In the embodiment, the fixed seat 2 is firstly fixed by using the locking blocks and then the mounting plate 4 is driven to move up and down by starting the telescopic cylinder 3, so that the height of the control box 2 is adjusted. Then, the screw is driven to rotate by rotating the rotary knob 8. Meanwhile, the sliding blocks 6 drive the fixed plate 9 to move, so that the horizontal position of the control box 2 is adjusted. Moreover, the control box 2 is rotated so that the direction of the control box 2 can be adjusted, and then, the control box 2 is fixed by using the clamping rod 14.

In the system, through the arrangement of a plurality of adjusting mechanisms, the monitoring and early warning mechanism can be freely adjusted, so that the monitoring efficiency of the early warning system is promoted.

The above mentioned are only preferred specific embodiments of the present disclosure. However, the scope of protection of the present disclosure is not limited to the embodiments described herein. Any technicians skilled in the technical field are within the technical scope disclosed by the present disclosure; and any replacements or modifications according to the technical schemes of the present disclosure and ideas shall be included in the scope of protection of the present disclosure.

What is claimed is:

1. A real-time landslide disaster monitoring and early warning system based on Beidou positioning, comprising a data acquisition module, a signal transmission module and a remote early warning center, wherein the output end of the data acquisition module is connected with the input end of the signal transmission module, and the output end of the signal transmission module is connected with the input end of the remote early warning center;

the data acquisition module comprises a fixed seat and a control box, the bottom of the control box is connected with a camera, one side of the control box is fixedly connected with a warning device and a displacement monitoring module, and the side, away from the warning device, of the control box is fixedly connected with a data connector;

the signal transmission module comprises a controller, a memory, a power supply, a Beidou positioning module and a signal projector, the controller, the memory, the power supply, the Beidou positioning module and the signal projector are all arranged in the control box, the output ends of the Beidou positioning module, the power supply and the camera are all connected with the input end of the controller, and the output end of the controller is respectively connected with the input ends of the signal projector, the memory, the data connector and the warning device;

the bottom of the fixed seat is fixedly connected with a telescopic cylinder, the output end of the telescopic cylinder is fixedly connected with a mounting plate, a mounting groove is formed in the bottom of the mounting plate, a screw is rotatably connected into the mounting groove, the screw is sleeved with a plurality of sliding blocks through treads, a sliding rod is fixedly connected into the mounting groove, a through hole corresponding to the sliding rod is formed in the sliding blocks, and one end of the screw penetrates through the inner wall of the mounting groove and is fixedly connected with a rotary knob; and the bottoms of the sliding blocks are connected through a fixed plate, the bottom of the fixed plate is rotatably connected with the control box through a rotating rod, the bottom of the control box is fixedly connected with a plurality of symmetrically arranged guide rods, the bottom of the guide rod is fixedly connected with a guide block, an annular sliding rail corresponding to the guide blocks is arranged at the bottom of the fixed plate, the bottom of the control box is fixedly connected with a fixture block, a clamping rod is slidably inserted to the fixture block, and a plurality of clamping grooves corresponding to the clamping rod are formed in the outer wall of the fixed plate in an encircling mode.

2. The real-time landslide disaster monitoring and early warning system based on Beidou positioning according to claim 1, wherein the displacement monitoring module is a laser displacement sensor.

3. The real-time landslide disaster monitoring and early warning system based on Beidou positioning according to claim 1, wherein a power connector is fixedly embedded into the exterior of the control box, and the output end of the power connector is connected with the input end of the power supply.

4. The real-time landslide disaster monitoring and early warning system based on Beidou positioning according to claim 1, wherein a mounting port is formed in the bottom of the control box, a baffle plate is rotatably connected into the mounting port through a rotating shaft, and the end, away from the rotating shaft, of the baffle plate is fixedly connected with the inner wall of the mounting port through a locking screw.

5. The real-time landslide disaster monitoring and early warning system based on Beidou positioning according to claim 1, wherein the top of the fixed seat is fixedly connected with a plurality of locking blocks, and a locking port is formed in the locking block.

6. The real-time landslide disaster monitoring and early warning system based on Beidou positioning according to claim 1, wherein one end of the rotary knob is rotatably connected with an arc-shaped inserted rod through a rotating shaft, and a plurality of inserted grooves corresponding to the arc-shaped inserted rod are formed in the mounting plate in an encircling mode.

7. The real-time landslide disaster monitoring and early warning system based on Beidou positioning according to claim 1, wherein the end, close to the fixed plate, of the clamping rod is fixedly sleeved with a clamping sleeve.

8. The real-time landslide disaster monitoring and early warning system based on Beidou positioning according to claim 1, wherein a plurality of steel balls are slidably connected into the annular sliding rail, and the edge of the steel ball is in contact with the guide block.

9. The real-time landslide disaster monitoring and early warning system based on Beidou positioning according to claim 1, wherein the mounting plate is connected with the bottom of the fixed seat through a plurality of symmetrically arranged dampers.

10. The real-time landslide disaster monitoring and early warning system based on Beidou positioning according to claim 1, wherein the positioning module is a Beidou positioning module.

\* \* \* \* \*